Aug. 5, 1969  R. F. JOHNSTON  3,459,471
CONTINUOUS FILM FEED PROJECTION SYSTEM
Filed Nov. 4, 1966  2 Sheets-Sheet 1

Inventor:
Robert F. Johnston.
By Griffin and Branigan
Atty's.

Aug. 5, 1969  R. F. JOHNSTON  3,459,471
CONTINUOUS FILM FEED PROJECTION SYSTEM
Filed Nov. 4, 1966  2 Sheets-Sheet 2
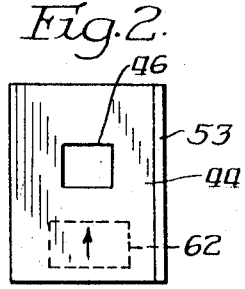
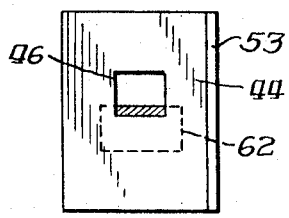
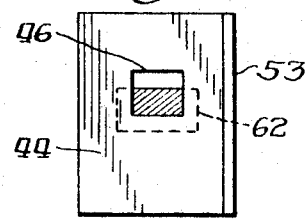
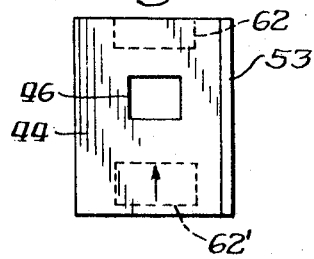
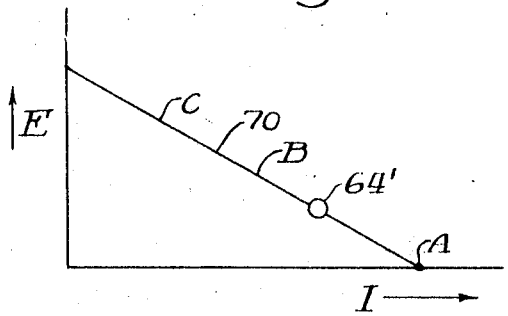
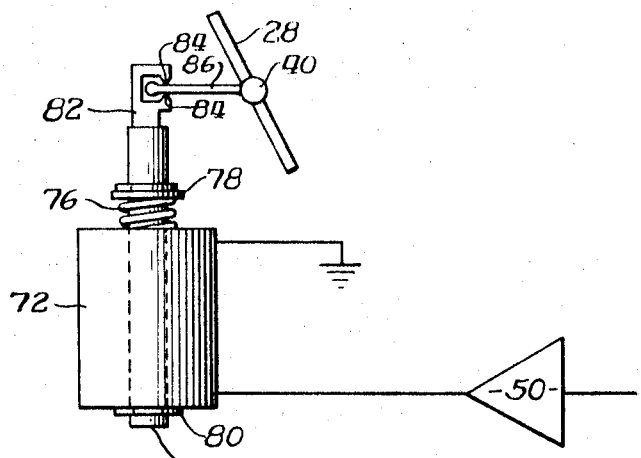
Inventor:
Robert F. Johnston

United States Patent Office 3,459,471
Patented Aug. 5, 1969

3,459,471
CONTINUOUS FILM FEED PROJECTION SYSTEM
Robert F. Johnston, Wildwood, Ill., assignor to Bell & Howell Company, Chicago, Ill., a corporation of Illinois
Filed Nov. 4, 1966, Ser. No. 592,050
Int. Cl. G03b 41/10
U.S. Cl. 352—105                              15 Claims

ABSTRACT OF THE DISCLOSURE

A motion picture projector has a mirror mounted on the shaft of a galvanometer. Images of the film frame and of a control aperture are projected onto the mirror adjacent each other. The image of the control aperture is reflected from the mirror through a small aperture in an opaque shield and onto a photocell mounted behind the shield. As the film frame moves continuously through the projection gate the image of the control aperture moves progressively to illuminate a greater portion of the photocell. The photocell increases current to the galvanometer which pivots the mirror to counteract the movement of the film and stabilize the image on the screen. A shutter periodically interrupts the light to the photocell to allow the mirror to return to its initial position where it locks onto the succeeding frame image.

---

This invention relates to motion picture projection apparatus and more particularly to projection apparatus in which a film strip is moved continuously through a projection gate.

Many complex systems have been devised in which a film strip is moved continuously through a projection gate. In many of these systems tilting and/or rotating mirrors driven by complex mechanical or electrical means have been utilized to compensate for the film motion to produce a stationary projected image on the screen. The need for trouble-free, simple and reliable projectors of this type has long been recognized by those skilled in the art. It is, accordingly, the object of this invention to provide a new and improved motion picture projection system wherein the film is continuously moved through the projection device.

The prior art teaches a number of means for producing a stationary projected image on a screen. Some prior art devices provide reflecting means comprising semi-circular mirrors which are mounted for rotation and are tilted independently of each other by suitable cam members. Other prior art devices employ a plurality of mirrors arranged to provide a cylindrical drum which is rotated so that each successive image is reflected by each successive mirror.

Examples of continuous film motion projectors are found in U.S. Patents Nos. 2,506,198, 2,843,006, 2,770,163, and 3,067,284. While the foregoing devices have provided generally satisfactory results, they all suffer from their inherent complex nature which adds to their initial cost and increases susceptibility to component malfunction.

It is, accordingly, a primary object of this invention to provide a new and improved apparatus and method for projecting motoin pictures from continuously moving film.

Another object of this invention is the provision of new and improved apparatus and method for controlling the movement of a compensating projection mirror employed for projecting images from constantly moving film.

Yet another object of this invention is the provision of reliable and economical means for driving a compensating projection mirror used to project images from a continuously moving film.

Various other objects and many of the attendant advantages of this invention will be readily appreciated as the same become better understood by reference to the following detailed description when considered in connection with the accompanying drawings in which like reference numerals designate like parts throughout the figures thereof and wherein:

FIGS. 2 through 5 illustrate successive cyclic positions of a control beam with a control opening during a cycle of projection of a single frame;

FIG. 6 is a control voltage versus current output characteristic of a control amplifier employed in the invention; and FIG. 7 illustrates a mirror drive mechanism employed in a second embodiment of the invention.

Figure 1:
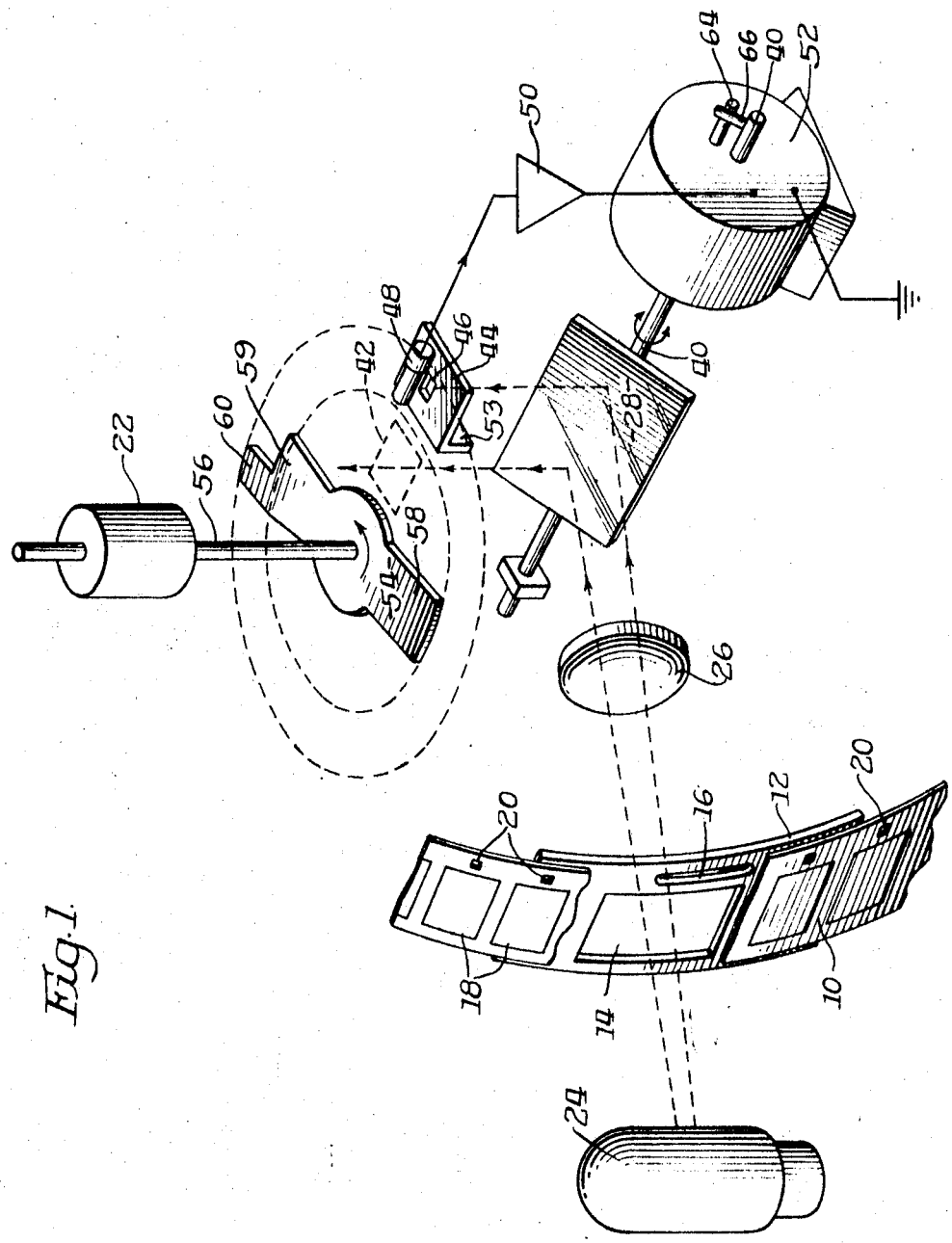
FIG. 1 is a schematic perspective view of a first embodiment of the invention.

Briefly, the above objects of this invention are achieved by projecting frame images and control aperture images from a moving film strip onto a pivotable compensating mirror. The mirror is rotated in a direction to compensate for film movement to thereby project a stationary image onto the screen. The position of the projected image of the control aperture reflected from the moving mirror is sensed by photosensitive means which provides varying electrical signals to control the movement of the mirror. The image of the control aperture is cyclically interrupted by means of a rotating shutter driven in correlation with the film feed drive means. The interruption of the control aperture image causes the compensating mirror to cyclically return to a starting position to enable projection of a succeeding frame.

Turning first to FIG. 1, a film strip 10 is continuously moved through a projection gate plate 12 having a frame projection aperture 14 and a control signal projection aperture 16. The film comprises a series of successive frames 18 associated in a well-known manner. A plurality of control apertures 20 are equidistantly spaced along one edge of the film 10 in given relationship to each frame. In certain instances, the control apertures 20 need be nothing more than the usual sprocket feed holes. However, in other instances, it is desirable to use transparent areas rather than actual openings. Therefore, the term "control apertures," as used hereinafter, refers to either actual apertures or merely transparent areas on the film. The film 10 is driven at a constant speed by film drive means 22 in any conventinoal manner.

A projection light source 24 projects the frame images through projection aperture 14 and a conventional lens system 26 onto a compensating mirror 28 mounted for rotation on a mirror shaft 40. The images of control apertures 20 are also projected through lens 26 onto mirror 28. The frame images 42 are reflectively projected from mirror 28 as shown in FIG. The control aperture image is reflectively projected against a plate 44 in an area adjacent to a small control opening 46. A photosensor 48 is located opposite opening 46 so that any portion of the control aperture image which passes through opening 46 impinges on the photosensitive means 48 to create an electrical output therefrom. The output from the photosensitive means 48 is amplified by an amplifier 50 and the output of the amplifier 50 is connected to a galvanometer 52. The mirror shaft 40 is formed integral with, or connected to, the galvanometer shaft so that variations in signals applied to the galvanometer result in turning movement of shaft 40.

Frame images 42 reflectively projected from mirror 28 are directed onto a screen or other suitable image receiving surface (not shown). A shield 53 extending downwardly from plate 44 prevents scattered reflections from the frame image beam from entering opening 46. Obviously, it is necessary that the movement of the film be compensated for so that the sucessive frame images will be stationary with respect to the screen or other image receiving surface employed. This stabilization is accomplished by rotating mirror 28 at a given rate to track or follow each frame as it passes across the frame projection apertuer 14. The manner in which this is acomplished is set forth hereinafter.

A rotary shutter 54 is rotated by a film drive means 22 through shaft 56. The shutter 54 is rotated at a speed proportional to the film feed speed. The shutter is constructed of thin light impervious metal and has radially extending vanes 58 and 59 which serve to block projection of the frame images 42 twice for each rotation of the shutter in an obvious manner. The shutter 54 is dimensioned and spaced from images 42 so that the vanes 58 and 59 completely block images 42 twice during each revolution of the shutter 54. A smaller control vane 60 extends radially from vane 59 so that vane 60 will completely cover the small control opening 46 once during each revolution of rotary shutter 54.

FIGS. 2 through 5 illustrate sucessive steps in a cycle of operation of the projector. These figures are bottom views of plate 44 and illustrate the relationship of the small opening 46 and the projected image 62 of control aperture 20.

Turning first to FIG. 2, the image 62 of a control aperture 20 is shown impinging on the surface of plate 44. Image 62 is moving in the direction indicated by the arrow within the image. Note that no portion of image 62 is impinging on opening 46; consequently, the output from photosensitive means 48 will be minimal. The photosensitive means 48 is connected with the amplifier 50 in a conventional manner so that the output current of the amplifier is inversely proportional to the input signal strength E. Consequently, for conditions illustrated in FIG. 2 (i.e., no light passing through opening 46), maximum current is flowing from amplifier 50 and the amplifier is operating in condition A. This condition is referred to as the initial condition of the amplifier and serves to rotate the mirror to its extreme clockwise position (determined by a mechanical stop 64 on the galvanometer 52) which is referred to as the initial position of the mirror. FIG. 6 illustrates the functional locations 64' of the mechanical stop 64 as related to the voltage versus current characteristic curve 70 of the amplifier. It should be noted that the initial condition A of the amplifier is spaced along characteristic curve 70 from the functional location 64' of the mechanical stop. Consequently, when the amplifier is in its initial condition, the mirror is forcefully biased against stop 64. This provides a very rapid return of the mirror to its initial position when the amplifier assumes its initial position.

Continued movement of the film strip 10 across projection gate plate 12 causes the image 62 of the control aperture to move upwardly to the position illustrated in FIG. 3. In this position, the control aperture image 62 overlies a portion of opening 46 as shown by the cross hatching in FIG. 3. Therefore, light will pass through opening 46 into photosensitive means 48 to increase the voltage E output from photosensitive means 48. As the voltage E increases, the current output I from amplifier 50 will decrease as the amplifier condition shifts upwardly to the left along characteristic curve 70 of FIG. 6. Consequently, the amplifier condition will move upwardly along characteristic curve 70 from condition A past position 64' to position B which represents the amplifier condition for the position of control image 62 in FIG. 3. As the amplifier condition moves past point 64', mirror 28 will begin to be rotated by galvanometer 52 to "lock-on" the frame image and rotate at a rate that compensates for the film motion through the projector to project a stabilized frame image. It is obviously undesirable to project the frame images prior to the time that the mirror has "locked-on" the frame image; consequently, vane 59 is constructed to be sufficiently wide so that frame image projection is prevented by vane 59 for a time period of duration sufficient to enable complete frame image "lock-on."

Continued movement of the film strip 10 through the projector causes the control image 62 to increasingly overlie a large portion of opening 46 as shown in FIG. 4. Consequently, the amplifier condition will continue to shift upwardly along characteristic curve 70 to position C which corresponds to the piston of image 62 in FIG. 4. Obviously, the mirror will be rotated as the amplifier shifts from position B to position C. The amount of rotation of mirror 28 is such that the movement of the film strip is compensated for and the projected frame image 42 is stationary with respect to the screen upon which it is projected.

It should be noted that the actual amount of image-shifting between the condition of FIG. 3 and the condition of FIG. 4 has been purposefully magnified to illustrate the manner in which the device functions. In actuality, the image shift between the conditions of FIGS. 3 and 4 is very small and is in the nature of approximately $\frac{1}{100}$ inch or less.

As the particular frame being projected reaches the vicinity of the upper end of projection aperture 14, it is obviously necessary for the mirror to be rotated back to its initial position to allow projection of the succeeding frame. During this return mvement of mirror 28, it is also obviously desirable to block projection of portions of the film over apertuer 14 which would be blurred by the return mirror movement and the movement of the film. Rotary shutter 54 provides means for both causing the mirror to return to its initial position and blocking projection of the film over aperture 14 during this return movement. The manner in which this is accomplished will now be discussed in detail.

As was noted previously, shutter 54 is driven in synchronization with the feed of film 10 by means 56 connected to the film drive 22. As any particular frame on the film 10 moves across the aperture 14, the projected image 62 of the associated control aperture 20 moves across control opening 46 in the manner illustrated in FIGS. 3 and 4. It must be noted that the actual displacement of the projected image 62 of the associated control aperture 20 as illustrated in FIGS. 3 and 4 is very small (on the order of $\frac{1}{100}$ inch or less, which motion is undetectable since it appears stationary to the eye at ordinary viewing distances) since it is compensated by the counter rotation of mirror 28. When the frame being projected has almost reached the end of its travel across aperture 14, it is necessary to rotate mirror 28 to its initial position to begin a tracking movement of the next frame. The return movement of mirror 28 to its initial position is accomplished by movement of control vane 60 across control opening 46 which movement causes the output of photosensitive means 48 to immediately drop to place amplifier in condition A. Galvanometer 52 rotates mirror 28 to its initial position determined by stop 64. The shutter 54 is rotated in a counter clockwise direction so that control vant 60 blocks control opening 46 and vane 59 concurrently blocks the projection path of frame images 42 while the mirror 28 is being returned to its initial position. This blocking of the frame images 42 prevents a blurred image from being projected onto the screen. As noted previously, vane 59 is considerably wider than control vane 60 so that the optical path of the frame images 42 remains blocked for a longer period of time than does the control opening 46. Therefore, the next succeeding control aperture image 62' will be projected onto plate 44 as illustrated in FIG. 5 and will be driven across the plate 44 by the return action of mirror 28. When the photocell "sees" this next aperture image 62' the mirror's direction of rotation instantly reverses. Consequently, the mirror 28 "locks-on" to the second frame and rotates to compensate for movement of the second frame under the control of the image 62'. As soon as the mirror 28 has "locked-on" to the second frame, the vane 59 (which is driven at a constant speed) has rotated past the optical path of the frame images 42 (in the manner discussed previously) so that the second frame is projected onto the image receiving screen in the same manner as was the first frame. The pivotal movement of mirror 28 is controlled by image 62', photosensitive means 48, etc., so that the projected image of the second frame is stationary with respect to the image receiving screen.

When each frame being projected has moved approximately half way through its traversal of aperture 14, projection of the frame is briefly interrupted by shutter vane 58. Vanes 58 and 59 provide a flicker frequency of sufficient magnitude to present a "flickerless" image to the viewing audience. Obviously, if greater flicker frequency should be desired, a shutter having more than two vanes could be employed. However, any such shutter would have to be constructed so that a control vane would cross opening 46 only once during the traversal of each frame past aperture 14.

FIG. 7 illustrates a second embodiment of this invention wherein different means are employed for rotating mirror 28. In this embodiment, the mirror 28 is rotated by means of a coil 72 connected to the output of amplifier 50. Coil 72 is of the voice-coil type conventionally employed in loud speakers and the like and is characterized by extremely quick response to current changes. A plunger 74 is mounted within coil 72 for reciprocating movement. Plunger 74 is biased upwardly by a coil spring 76 surrounding plunger 74 and engaging a circular abutment 78 on plunger 74. The upper extent of movement of plunger 74 is limited by stop member 80 fixed to the lower end of the plunger. This position of movement is the initial position of the plunger and is functionally identical with characteristic position 64' illustrated in FIG. 6. Therefore, when amplifier 50 is in any condition to the right of position 64' on characteristic curve 70, the plunger 74 is in its initial condition. This initial condition is illustrated in FIG. 7. Changes in amplifier conditions along characteristic curve 70 to the left of position 64' cause plunger 74 to move. A drive member 82 fixed to the upper end of plunger 74 and having knife edges 84 engaging a lever 86 fixedly attached to shaft 40 serves to rotate shaft 40 and mirror 28 upon movement of plunger 74. This structure provides a low friction means for converting the linear movement of plunger 74 into rotational movement of mirror 28. The remaining structural elements of the second embodiment are identical with those of the first embodiment illustrated in FIG. 1.

It should be understood that the above described embodiments of this invention can be modified in many ways which will be obvious to those skilled in the art. For instance, the stop 64 can be eliminated from the galvanometer 52 if the mirror 28 and its supporting shaft 40 have sufficient inertia to provide a proper time lag of the mirror movement when the amplifier is caused to assume condition A by blockage of control opening 46 by control vane 60. Amplfier 50 immediately returns to condition A upon blockage of opening 46 as noted above. However, the inertia of the shaft 40 and mirror 28, etc., obviously results in a finite time lag between mirror movement and the change in the output of the amplifier 50 creating the mirror movement. Therefore, it is possible (by the use of a mirror and shaft having required inertia characteristics) to provide a required time lag in the mirror movement so that the mirror will return to position 64' at approximately the same time that the next sprocket hole image 62' is beginning to be projected through control opening 46 so that the feedback system will then lock onto image 62'. This is possible because the photocell will instantaneously shift the amplifier away from condition A to cause the galvanometer to stop the mirror and begin rotation in the proper tracking direction at the proper compensating speed. In a similar manner, it will be obvious that stop 80 of the embodiment of FIG. 7 could be moved downwardly along plunger 74 so that stop 80 would never actually engage the body of coil 72 during operation of the device. These modifications, however, require a greater precision of assembly than the embodiments employing mechanical stop members but they provide a smoother more vibration-free operation.

Obviously, many other modifications and variations of the present invention are possible in the light of the above teachings. For example, it is not necessary that a single mirror 28 be employed on shaft 40. Two mirrors could just as easily be employed in place of the single mirror. By orienting such mirrors differently with respect to shaft 40, it would be possible to locate the photosensitive means 48, etc., in different positions as determined by space limitations in any particular projection environment. It is therefore to be understood that within the scope of the appended claims, the invention may be practiced otherwise than as specifically described.

The embodiments of the invention in which an exclusive property or privilege is claimed are defined as follows:

1. In a continuous film feed motion picture projector having a pivotable projection mirror for receiving frame images and control aperture images projected onto said mirror by a projection light source as frames and control apertures move through a projection gate, mirror drive means including:

variable signal producing means for detecting the position of the control aperture image reflected from said mirror and producing a substantially periodical output signal varying in accordance with variations in position of said control aperture image;

mirror driving means for driving said mirror in a first direction from an initial position under the control of said output signal so that movement of a first frame through said projection gate is compensated for and a stationary frame image is reflectively projected onto an image receiving surface from said mirror; and shutter means for intermittently interrupting said control aperture image to cause said mirror driving means to return said mirror to said initial position to enable subsequent stabilized projection of a second frame.

2. The device of claim 1 wherein said signal producing means comprises a light impervious member having an aperture through which a portion of the control aperture image is directed into photosensitive means.

3. The device of claim 2 wherein said mirror driving means comprises a galvanometer.

4. The device of claim 3 wherein said blocking means comprises a light impervious member mounted for cyclic movement in timed relation with film drive means.

5. The device of claim 4 wherein said blocking member comprises a rotatably driven light impervious member driven in synchronized relationship with the film.

6. The device of claim 5 wherein said rotatably driven member includes means for blocking frame image projection while said mirror is returning to said initial position.

7. The device of claim 6 wherein said rotatably driven member comprises plural radially extending vanes mounted for rotation about an axis spaced from the optic axis of the projector so that rotation of said member causes said vanes to intermittently block the frame images to prevent projection of said frame images.

8. The device of claim 7 wherein said blocking means comprises a relatively narrow control vane extending radially from one of said radially extending vanes to intermittently pass through the path of the projected control aperture image to block said control aperture image from impingement on said photosensitive means.

9. The device of claim 2 wherein said mirror driving means comprises a coil having linearly reciprocable means connected to said mirror by knife edge bearing means to pivot said mirror upon movement of said linearly reciprocable means.

10. The device of claim 9 wherein said blocking means comprises a light impervious member mounted for cyclic movement in timed relation with film drive means.

11. The device of claim 10 wherein said blocking member comprises a rotatably driven light imperious member driven in synchronized relationship with the film.

12. The device of claim 11 wherein said rotatably driven member includes means for blocking frame image projection while said mirror is returning to said initial position.

13. The device of claim 12 wherein said rotatably driven member comprises plural radially extending vanes mounted for rotation about an axis spaced from the optic axis of the projector so that rotation of said member causes said vanes to intermittently block the frame images to prevent projection of said frame images.

14. The device of claim 13 wherein said blocking member comprises a relatively narrow control vane extending radially from one of the said radially extending vanes to intermittently pass through the path of the projected control aperture image to block the control aperture image from impingement on said photosensitive means.

15. A method of projecting motion picture film, said method comprising the steps of:

continuously moving said film through a projection gate past a light source to project a first frame image and a first control aperture image onto a mirror pivotally mounted in a first position;

reflecting said frame image onto image receiving means and reflecting said control aperture image onto a light impervious plate having a control opening therein so that said control aperture image initially impinges on said plate adjacent said control opening as each control opening as the control aperture continues to the leading edge of each control aperture image moves over said control opening to pass through said control aperture moves into said projection gate but traverse said projection gate;

directing the leading edge of said control aperture image passing through said control opening into singular photoelectric means to cause said photoelectric means to produce a substantially periodically varying electrical output signal;

drivingly rotating said mirror from said first position to a second position and controlling the speed of rotation of said mirror during said movement from said first position to said second position solely by means of the output from said photoelectric means so that frame image directed into said image receiving means during the traversal of said frame through the projection gate is stationary with respect to said image receiving means;

terminating projection of said control aperture image onto said plate and through said aperture to said photoelectric means when said frame reaches a position adjacent the end of said projection gate; and drivingly rotating said mirror from said second position to said first position solely in response to the termination of said control aperture image projection whereby said mirror is in position to receive a succeeding frame image and a succeeding control aperture image for projection thereon.

References Cited

UNITED STATES PATENTS

| | | | |
|---|---|---|---|
| 2,215,464 | 9/1940 | Dorgelo | 352—109 |
| 2,506,198 | 5/1950 | Charles | 352—109 |
| 2,843,006 | 7/1958 | Tyler | 352—109 |
| 3,067,284 | 12/1962 | Baldwin | 352—109 X |

NORTON ANSHER, Primary Examiner

MONROE H. HAYES, Assistant Examiner

PO-1050
(5/69)

UNITED STATES PATENT OFFICE
CERTIFICATE OF CORRECTION

Patent No. 3,459,471      Dated August 5, 1969

Inventor(s) R. F. Johnston

It is certified that error appears in the above-identified patent and that said Letters Patent are hereby corrected as shown below:

Column 7, Claim 15, line 12 - please cancel "control opening as the control aperture continues to" and substitute --control aperture moves into said projection gate but--.

Claim 15, line 15 (column 8, line 2) - please cancel "control aperture moves into said projection gate but" and substitute --control opening as the control aperture continues to--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents